(12) United States Patent     (10) Patent No.:   US 12,576,609 B2

Schoeffter et al.     (45) Date of Patent:     Mar. 17, 2026

(54) REINFORCEMENT FOR A SIDE-IMPACT

(71) Applicant: Zephyros, Inc., Romeo, MI (US)

(72) Inventors: Mathieu Schoeffter, Molsheim (FR); Gérald Bugli, Molsheim (FR)

(73) Assignee: Zephyros, Inc., Romeo, MI (US)

( * ) Notice: Subject to any disclaimer, the term of this patent is extended or adjusted under 35 U.S.C. 154(b) by 0 days.

(21) Appl. No.: 17/780,132

(22) PCT Filed: Jan. 6, 2021

(86) PCT No.: PCT/EP2021/050116
§ 371 (c)(1),
(2) Date: May 26, 2022

(87) PCT Pub. No.: WO2021/140114
PCT Pub. Date: Jul. 15, 2021

(65) Prior Publication Data

US 2023/0008826 A1     Jan. 12, 2023

(30) Foreign Application Priority Data

Jan. 10, 2020    (EP) .................................... 20151178

(51) Int. Cl.
*B32B 3/12*       (2006.01)
*B32B 7/08*       (2019.01)
(Continued)

(52) U.S. Cl.
CPC .................. *B32B 3/12* (2013.01); *B32B 7/08* (2013.01); *B32B 7/12* (2013.01); *B32B 37/18* (2013.01); *H01M 50/242* (2021.01); *H01M*

*50/249* (2021.01); *B32B 2250/42* (2013.01); *B32B 2307/558* (2013.01); *B32B 2307/56* (2013.01);
(Continued)

(58) Field of Classification Search
CPC ......................................................... B32B 3/12
See application file for complete search history.

(56) References Cited

U.S. PATENT DOCUMENTS 4,428,599 A     1/1984   Jahnle
5,175,041 A   *   12/1992   Webb ................... B65D 81/056
                                    428/116
(Continued)

FOREIGN PATENT DOCUMENTS

CN      102858596 A     1/2013
CN      105395099 A     3/2016
(Continued)

OTHER PUBLICATIONS

English language translation of CN 108773111 A, generated on Oct. 6, 2023 with Espacenet website (https://worldwide.espacenet.com/ ).*
(Continued)

*Primary Examiner* — Humera N. Sheikh
*Assistant Examiner* — Julia L Rummel
(74) *Attorney, Agent, or Firm* — The Dobrusin Law Firm, P.C.

(57) ABSTRACT

The present invention relates to a reinforcement member made from a polymeric material. The present invention further relates to a vehicle comprising the reinforcement member, a method to absorb an impact on vehicle and a method to produce the reinforcement member.

10 Claims, 8 Drawing Sheets

(51) Int. Cl.

| | |
|---|---|
| *B32B 7/12* | (2006.01) |
| *B32B 37/18* | (2006.01) |
| *H01M 50/242* | (2021.01) |
| *H01M 50/249* | (2021.01) |
| *B62D 21/15* | (2006.01) |

(52) U.S. Cl.
CPC ....... *B32B 2457/10* (2013.01); *B32B 2571/00* (2013.01); *B32B 2605/00* (2013.01); *B62D 21/15* (2013.01); *H01M 2220/20* (2013.01)

(56) References Cited

U.S. PATENT DOCUMENTS

| | | | |
|---|---|---|---|
| 5,725,272 | A | 3/1998 | Jones |
| 5,819,408 | A * | 10/1998 | Catlin .................... B62D 21/15 |
| | | | 296/205 |
| 6,889,617 | B2 | 5/2005 | Taguchi |
| 7,290,828 | B2 | 11/2007 | Kosal et al. |
| 8,857,870 | B2 | 10/2014 | Chiba et al. |
| 10,252,754 | B2 | 4/2019 | Feng et al. |
| 10,429,006 | B2 | 10/2019 | Tyan et al. |
| 10,442,559 | B2 | 10/2019 | Dong et al. |
| 10,464,512 | B2 | 11/2019 | Gumpina et al. |
| 10,538,277 | B2 | 1/2020 | Belpaire |
| 10,570,258 | B2 | 2/2020 | Richardson |
| 10,718,086 | B2 | 7/2020 | Braymand |
| 10,807,299 | B2 | 10/2020 | Thienel |
| 11,110,670 | B2 | 9/2021 | Richardson |
| 11,708,115 | B2 | 7/2023 | Cauchie |
| 2002/0033617 | A1 | 3/2002 | Blank |
| 2002/0153719 | A1 | 10/2002 | Taguchi |
| 2004/0212220 | A1 | 10/2004 | Riley et al. |
| 2004/0227377 | A1 | 11/2004 | Gray |
| 2008/0044621 | A1* | 2/2008 | Strauss ................. B22F 3/1112 |
| | | | 428/116 |
| 2010/0117397 | A1 | 5/2010 | Richardson |
| 2011/0189428 | A1 | 8/2011 | Belpaire |
| 2012/0085862 | A1* | 4/2012 | Pangalila ............... B64D 11/04 |
| | | | 29/428 |
| 2012/0104778 | A1 | 5/2012 | Mana et al. |
| 2012/0164358 | A1 | 6/2012 | Schneider |
| 2014/0203592 | A1 | 7/2014 | Nagwanshi |
| 2014/0265443 | A1 | 9/2014 | Meaige et al. |
| 2016/0167544 | A1 | 6/2016 | Barbat |
| 2016/0194036 | A1 | 7/2016 | Kurokawa |
| 2017/0047887 | A1* | 2/2017 | Hilliard ................... F24S 23/75 |
| 2018/0036970 | A1 | 2/2018 | Chmielewski |
| 2018/0037342 | A1 | 2/2018 | Dong et al. |
| 2018/0100621 | A1* | 4/2018 | Tyan ....................... B32B 25/02 |
| 2018/0186227 | A1 | 7/2018 | Stephens |
| 2018/0361700 | A1* | 12/2018 | Song .................... B29C 66/721 |
| 2019/0045870 | A1 | 2/2019 | Safar |
| 2020/0157293 | A1 | 5/2020 | Chmielewski |
| 2021/0053625 | A1 | 2/2021 | Richardson |
| 2021/0237377 | A1 | 8/2021 | Richardson |
| 2022/0080912 | A1 | 3/2022 | Barz |
| 2022/0097776 | A1 | 3/2022 | Royston |
| 2022/0145000 | A1 | 5/2022 | Richardson |

FOREIGN PATENT DOCUMENTS

| | | | |
|---|---|---|---|
| CN | 105398099 | A | 3/2016 |
| CN | 107680698 | A | 2/2018 |
| CN | 107848476 | A | 3/2018 |
| CN | 207454635 | U | 6/2018 |
| CN | 108773111 | A | 11/2018 |
| CN | 110524960 | A | 12/2019 |
| DE | 102007025930 | A1 | 12/2008 |
| DE | 102008015960 | A1 | 10/2009 |
| EP | 1251054 | A2 | 10/2002 |
| EP | 2147848 | A1 | 7/2008 |
| EP | 3710341 | A1 | 9/2020 |
| JP | 2003001731 | A | 1/2003 |
| JP | 2004322876 | A | 11/2004 |
| JP | 2010/036696 | | 2/2010 |
| KR | 20120116829 | A | 10/2012 |
| WO | 02/22387 | A1 | 3/2002 |
| WO | 2005/028178 | A1 | 3/2005 |
| WO | 2008/014250 | A1 | 1/2008 |
| WO | 2010/018190 | A1 | 2/2010 |
| WO | 2010/054194 | A1 | 5/2010 |
| WO | 2012/056349 | A1 | 5/2012 |
| WO | 2014/113544 | A1 | 7/2014 |
| WO | 2015/004271 | A2 | 1/2015 |
| WO | 2015/054836 | A1 | 4/2015 |
| WO | 2015/061291 | A1 | 4/2015 |
| WO | 2019/201751 | A1 | 10/2019 |
| WO | 2020/205192 | A1 | 10/2020 |
| WO | 2020/214769 | A1 | 10/2020 |
| WO | 2020/247903 | A1 | 12/2020 |
| WO | 2021/080917 | A1 | 4/2021 |
| WO | 2022/096319 | A1 | 5/2022 |

OTHER PUBLICATIONS

PCT International Search Report & the Written Opinion dated Apr. 13, 2021, Application No. PCT/EP2021/050116.
International Preliminary Report on Patentability dated Jul. 12, 2022, Application No. PCT/EP2021/050116.
Chinese First Office Action dated Dec. 8, 2023, Application No. 202180008575.6.
Chinese Notification of the Second Office Action & Search Report dated May 13, 2024, Application No. 202180008575.6.
Brazilian Office Action dated May 14, 2024, Application No. BR112022012944-0.
Lightweighting World The Magazine of Innovation + Collaboration, Preview Issue 2016.
Start with Sika, Car Body Reinforcement with Sika, GALM Birmingham—Apr. 2017, Denis Souvay.
Body Shop Structural Inserts, Safer Rides; Added Strength Start with Sika, Innovative Approach for Improving Roof Crush Reference, 2006.
Head Impact Characterization of Generic A-Pillar of an Automobile, West Virginia University; 1999.
Structural Plastic Inserts in the Car Body, Innovation, Plastics, 2008, Dr. Stefan Glaser.
Design Optimization of a Vehicle B-Pillar Subjected to Roof Crush Using Mixed Reactive Taboo Search, Research Gate, Oct. 20, 2016.
Opposition Brief as filed dated Nov. 10, 2022, Application No. EP3710341B1.

* cited by examiner d)

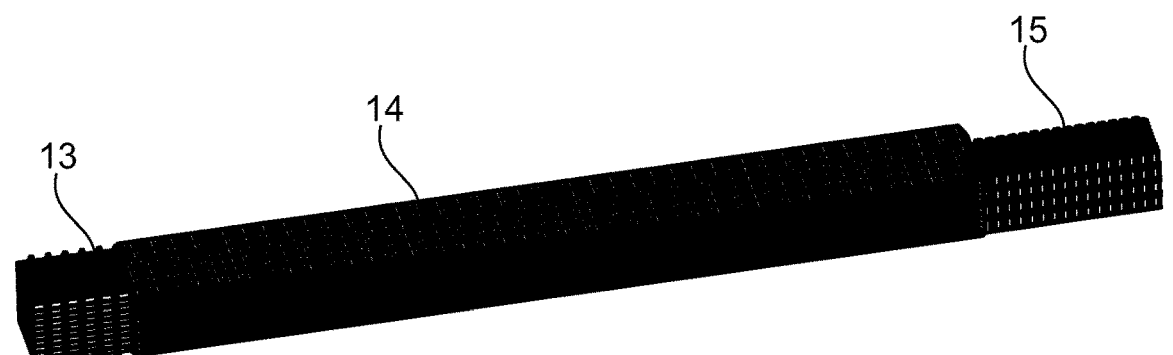
Fig. 8
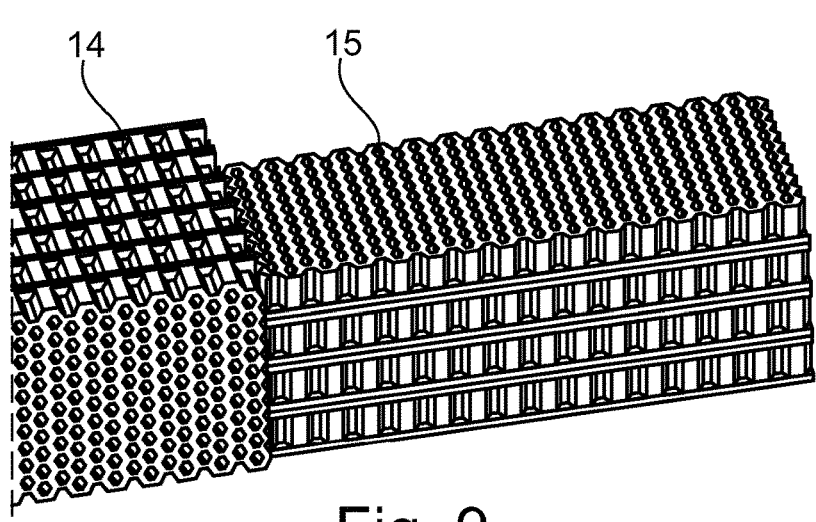
Fig. 9
Fig. 10

REINFORCEMENT FOR A SIDE-IMPACT

The present invention relates to a reinforcement member made from a polymeric material. The present invention further relates to a vehicle comprising the reinforcement member, a method to absorb an impact on vehicle and a method to produce the reinforcement member.

Battery cases in vehicles must be highly protected against impacts, because of the fire hazard. It is therefore the problem of the present invention to provide a reinforcement member and a vehicle with improved impact-resistance, particularly side impact-resistance. Another problem is to provide a method of improved impact-absorption and an improved method to manufacture reinforcement members.

The problem is attained with a reinforcement member, which comprises a multitude of reinforcement elements, each element comprising a plate and a layer with a multitude of hollow cells, wherein the reinforcement elements are interconnected by a material bond and/or by a form- and/or force-fit.

The disclosure regarding this subject matter also applies to the other subject matters and vice versa. Subject matters disclosed regarding this embodiment of the invention can also be included in other embodiments and vice versa.

The present invention relates to a reinforcement member, preferably made from a polymeric material, more preferably nylon. Each reinforcement member comprises a multitude, preferably two, three four, five or more reinforcement elements, which can be provided as semi-finished products. Each reinforcement element comprises a plate and a layer of a multitude of hollow cells, preferably identical hollow cells within one reinforcement element. The plate and the layer of hollow cells can be interconnected for example by gluing and/or welding and/or moulding, preferably overmoulding, or the semi-finished product can be provided as one piece, for example by moulding, preferably injection moulding. The plate and the layer of hollow cells can also be connected by a by form- and/or force-fit. The plate can be continuous flat part, whose thickness is significantly smaller than its length and width. However, the plate can also comprise hollow sections. The thickness of the plate is preferably between 0.5-3 mm. The plate and the layer of hollow cells can be made of the same or different material.

According to the invention, each reinforcement element comprises a layer of hollow cells, preferably an array of hollow cells. The hollow cells within one layer are preferably identical.

Each cell comprises a sidewall, preferably a closed, for example ring-shaped, sidewall, and has a first and a second end, which delimit the longitudinal extension of the structure. The sidewall has preferably a thickness between 1 and 5 mm. The axial length of the cell between the two ends is preferably 10-50 mm. One of these ends is in contact with the plate and secured to the plate. The center axis of the cell preferably extends perpendicular to the surface of the plate. The layer of hollow cells can be a honeycomb structure or a structure of a multitude of adjacent tubes with, for example a round, a square, a polygonal or an elliptic cross-section. The tubes are preferably provided as an array and can be distant from each other or in touch with each other. Adjacent cells can share a common sidewall.

Further according the invention, the reinforcement elements are interconnected by a material bond, for example by gluing or welding. Alternatively or additionally, the reinforcement elements are connected by a form- and/or force-fit The connection of the reinforcement elements is preferably such that one of the two distal ends of the hollow cells of one reinforcement element is connected to the bottom of the plate of the adjacent reinforcement element. After the connection, the plates of adjacent reinforcement elements are preferably parallel and congruent. The cell of two adjacent reinforcement elements are preferably aligned. The form-and/or force-fit can be, for example a male/female-connection and/or a snap-fit, preferably, an irreversible snap-fit.

The material bond between two adjacent reinforcement elements is preferably executed by an adhesive layer which is provided on the plate, particularly on the surface of the plate that is opposite to the layer of hollow cells. This layer can be a continuous layer that extends over this entire surface. However, the adhesive can also be applied only locally, for example as string(s).

Two adjacent reinforcement elements within one reinforcement member may have a plate with the same or a different thickness. The cell-layer of two adjacent reinforcement elements within one reinforcement member may be identical or different, for example different in shape and/or material. The reinforcement elements within one reinforcement member are preferably designed to take over different functions. For example, one layer may provide stiffness, while another layer absorbs energy. Depending on this function is design of the cells, the plate and/or their material is specifically adopted.

Preferably, the hollow cells have a honeycomb structure.

The inventive reinforcement member is preferably designed such that the longitudinal extension direction of the hollow cells is parallel to the expected load direction, while the surface of the plate is at an angle, preferably perpendicular, to this load direction.

According to a preferred embodiment of the present invention, the reinforcement member is asymmetrical relative to one center plane. This preferred embodiment has the advantage that the reinforcement member rotates entirely and/or twists locally during a crash and thereby dissipates energy.

According to a preferred embodiment, the reinforcement member comprises along its main extension direction different zones. Preferably each zone is designed to absorb energy and/or provide stiffness in a different load-situation, for example during a front-, a rear- and a side-impact of a vehicle and/or during lifting of a vehicle for repair-works.

Preferably, the inventive reinforcement member comprises means, for example a clip to fix the reinforcement member in the structure, particularly of a vehicle.

The problem is also solved with a vehicle with a structure, wherein the structure is reinforced by the inventive reinforcement member.

The disclosure regarding this subject matter also applies to the other subject matters and vice versa. Subject matters disclosed regarding this embodiment of the invention can also be included in other embodiments and vice versa.

This embodiment of the present invention is directed towards a vehicle, which comprises a structure, preferably made from steel and/or aluminum. The structure is for example a pillar, a beam, a rocker or the like. Preferably, the structure is part and/or provided around a battery case, particularly to protect the batteries against an impact, particularly a side impact.

Preferably, the structure is hollow and the reinforcement member is placed, preferably fixed, in the cavity of this hollow structure.

Preferably, the reinforcement member is provided at the structure of the vehicle such that the longitudinal extension direction of the hollow cells is parallel to the reinforcement direction or impact direction. The plate main surface of the plate, defined by the length and the width of the plate extends at an angle, preferably perpendicular to the to the reinforcement direction or impact direction.

Preferably, the cross-section of the reinforced structure comprises an indentation. This indentation is preferably provided in a sidewall, particularly the sidewall that supports the reinforcement member during a load and/or a crash. Due to this indentation, the reinforcement member twists and deforms irreversibly during an impact.

The problem is also solved with a method to absorb an impact on a vehicle, wherein the reinforcement member rotates and/or twists during the impact.

The disclosure regarding this subject matter also applies to the other subject matters and vice versa. Subject matters disclosed regarding this embodiment of the invention can also be included in other embodiments and vice versa.

This method relates to energy absorption during an impact. According to the present invention, the reinforcement member rotates, preferably entirely or twists, preferably locally. The axis of rotation and/or twisting is preferably parallel to the main extension direction of the reinforcement member and/or perpendicular to the direction of the impact.

The reinforcement member preferably deforms plastically during the impact and thereby dissipates energy.

The problem is also solved with a method to produce a reinforcement member, wherein the reinforcement elements are glued or welded together and/or connected by a force- and/or form-fit.

This embodiment of the present invention relates to a method to produce a reinforcement member which comprises a multitude of reinforcement elements, which are provided as semi-finished parts. These semi-finished parts each comprise a plate and a layer of hollow cells. One end which delimit the longitudinal extension of the cells of one reinforcement element is connected with the plate of the adjacent reinforcement element. The connection can be a material bond, preferably by means of an adhesive and/or by means of welding, preferably under the influence of heat and/or pressure. Alternatively or additionally, two reinforcement elements are connected by a form- and/or force-fit, for example by means of a male-/female-connection and/or a snap-fit.

The plate and the layer of hollow cells of each reinforcement elements can be moulded as one single part or can be prefabricated and the attached to each other. The layer of hollow cells can be adhered to a plate. Other methods to produce the reinforcement elements is, for example, pultrusion, SMC and/or BMC.

The layer of hollow cells can be extruded and then cut to the desired axial length of the cells and/or the thickness of the layer of hollow cells. Alternatively, each reinforcement element comprising the hollow cells and the plate are moulded, more preferably as one piece.

In the following the inventions are explained according to the figures. These explanations do not limit the scope of protection. The explanations apply to all embodiments of the present invention likewise.

FIG. 5a-d shows the vehicle in a side impact situation.

Figure 6:
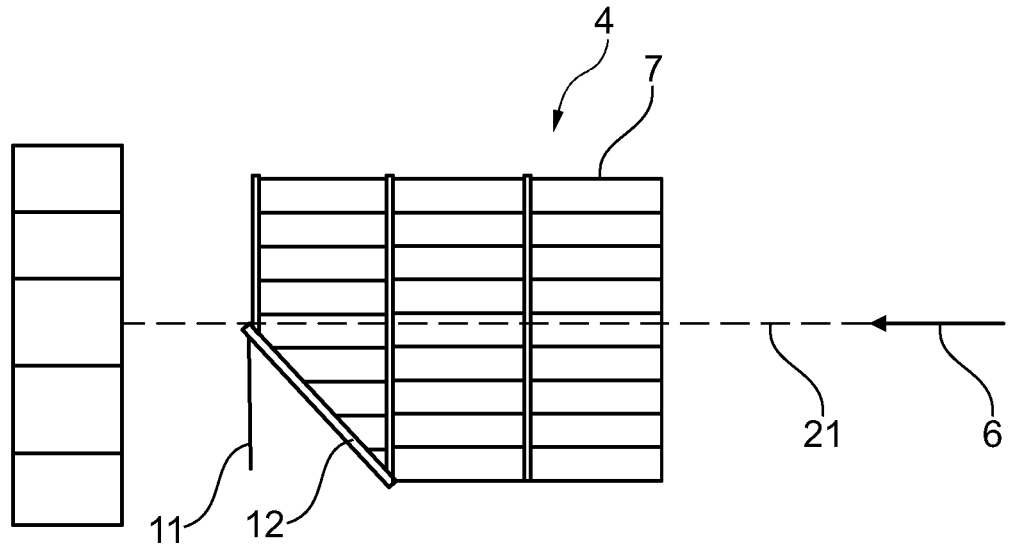

FIG. 6 shows an asymmetrical reinforcement member.

FIGS. 7-10 show a reinforcement member with different segments.

Figure 11:
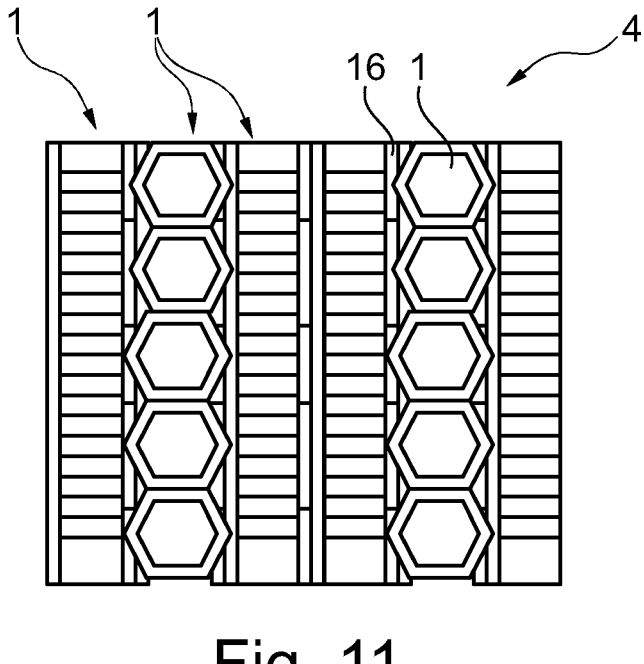
Figure 12:
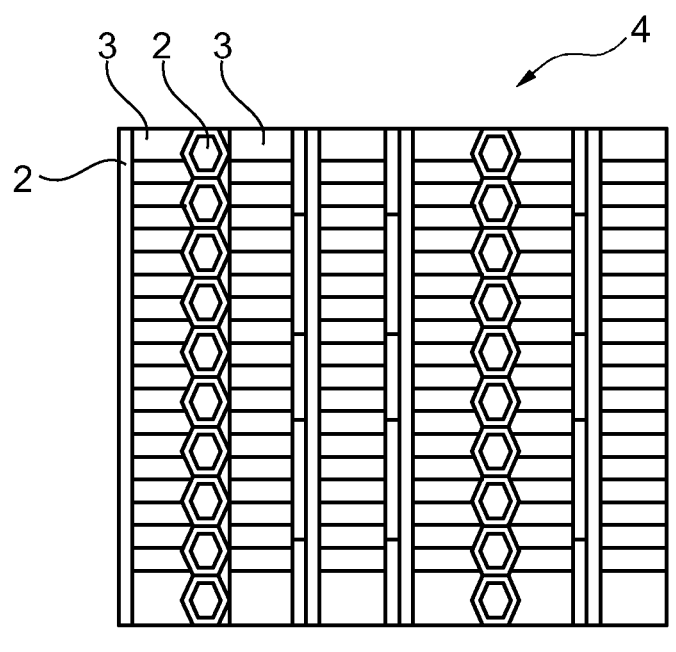

FIGS. 11-12 show special embodiment of the reinforcement member.

Figure 1:
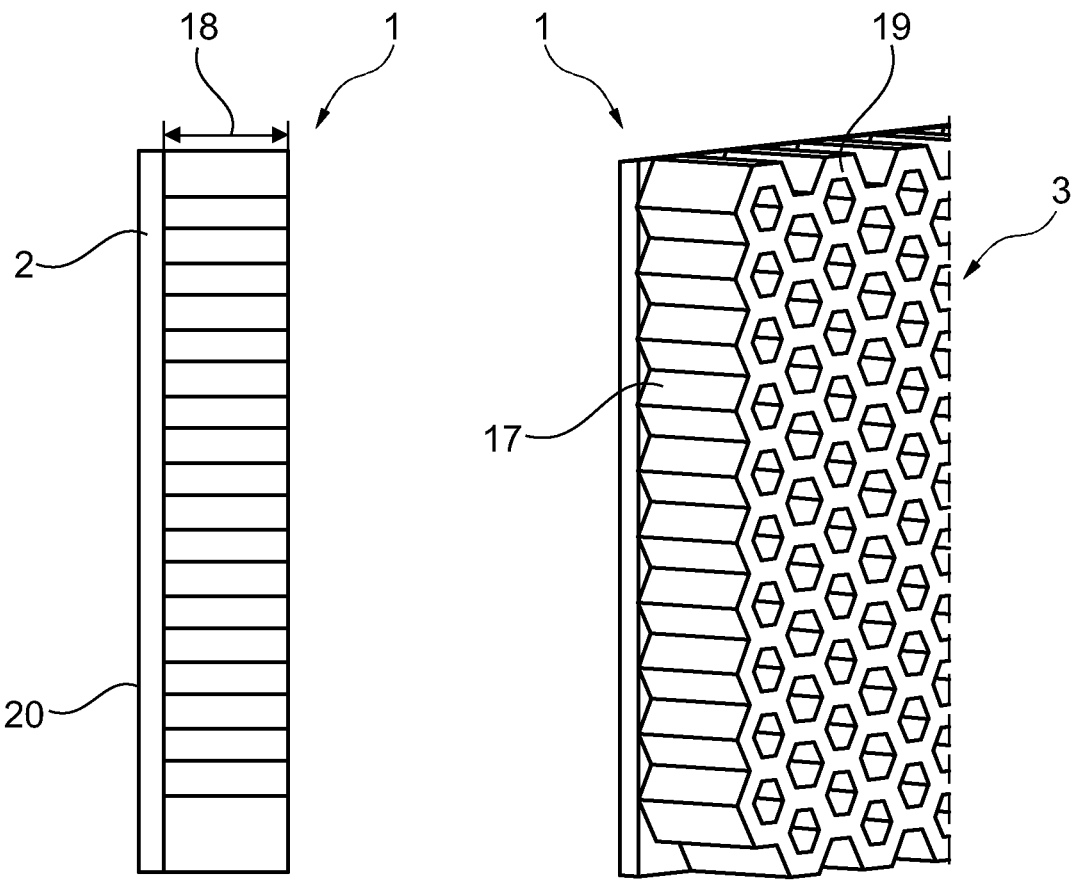
FIG. 1 shows an embodiment of a reinforcement element.

FIG. 1 shows an embodiment of the reinforcement element 1. In the present case this element comprises a plate 2, that extends over the entire length and widths of the reinforcement element 1. Directly adjacent and connected to the plate is a layer 3 of hollow cells, in the present case a honeycomb structure 17. Each cell of layer 3 has a longitudinal extension direction 18, which is delimited by two ends. One of those ends is connected to plate 2, for example by a material bond and/or a form- and/or form-fit. One end 19 of the layer 3 of hollow cells will be connected to the plate 2 of an adjacent reinforcement element 1 as shown below in further detail. The longitudinal extension 18 of the layer 3 is preferably 10-50 mm. The thickness of plate 2 is preferably 0.5-3 mm. The sidewall thickness of the cells is preferably between 1 and 5 mm and the inner diameter, the hollow diameter of the cells, is preferably between 4 and 15 mm. The skilled person understands that instead of a honeycomb structure, the cells 17 can be a pipe with a circular- or polygon-cross section. An elliptic cross section is also an option.

Figure 2:
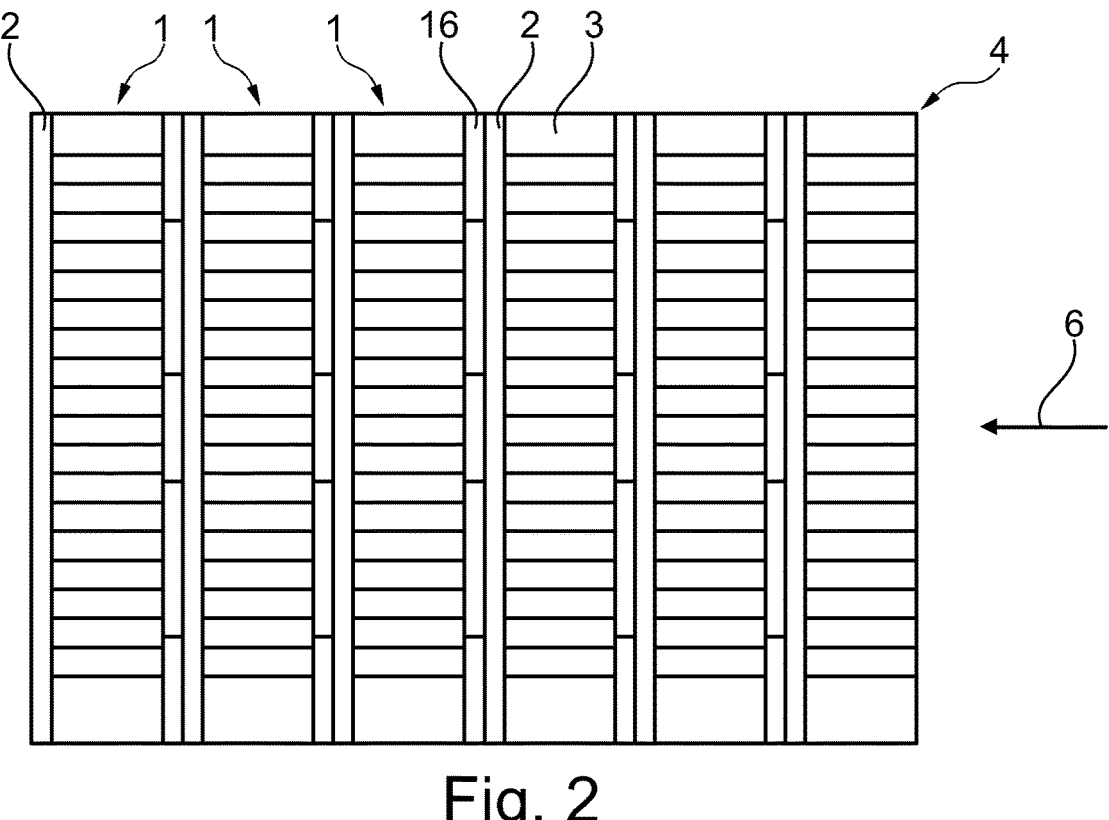
FIGS. 2-3b show different views of a reinforcement member.
Figure 3A:
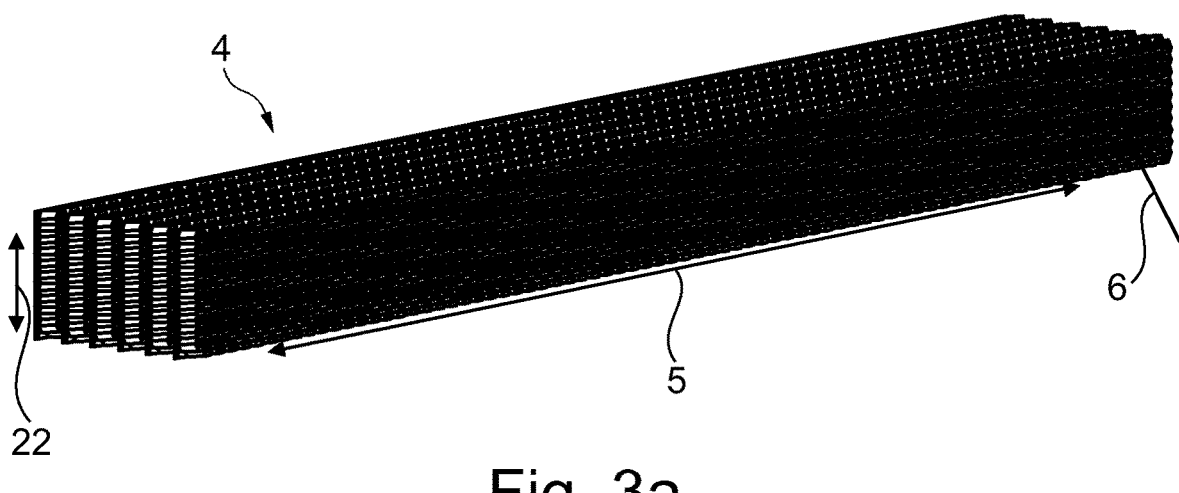
Figure 3B:
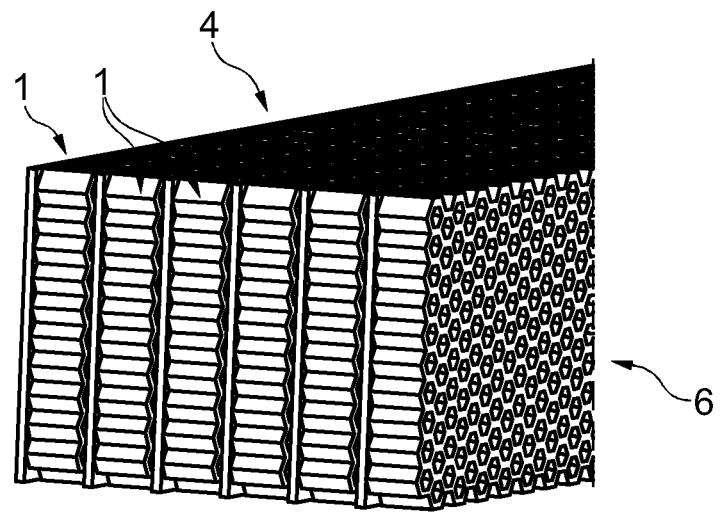

FIGS. 2-3b show an embodiment of a reinforcement member 4. In the present case, the reinforcement member 4 comprises 6 reinforcement elements 1. As can particularly be seen from FIG. 2, one end of the layer 3 of hollow cells is connected to the plate 2 of an adjacent reinforcement element. In the present case, the reinforcement elements are connected by an adhesive layer 16, which is, in the present case, applied only locally. In FIG. 2 the preferred impact direction 6 is also depicted. Preferably, the plates 2 extend perpendicular to the impact direction 6, while the main extension direction 18 of the hollow cells 3 is parallel to the impact direction.

Preferably, a layer 3 of hollow cells is the first layer, that faces the impact 6, while the reinforcement member 4 is on the opposite side delimited by a plate 2. Reference is now made to FIG. 3a, in which the main extension 5 of the reinforcement member 4 can be seen. The plate 2 and the layer 3 of hollow cells preferably extend over the entire main extension 5. Preferably, the same is true for the widths 22 of the reinforcement member 4. Particularly in FIG. 3b, it can be seen, that the adhesive between two adjacent reinforcement element 1 is carried out by, in the present case three, adhesive layers. The skilled person understands, that there can also be more or less adhesive layers and that the adhesive layer can also extend over the entire widths 22 and length 5 of the reinforcement member 4. From all FIGS. 2-3b it can be seen, that the impact 6 first hits a layer 3 of hollow cells.

Figure 4:
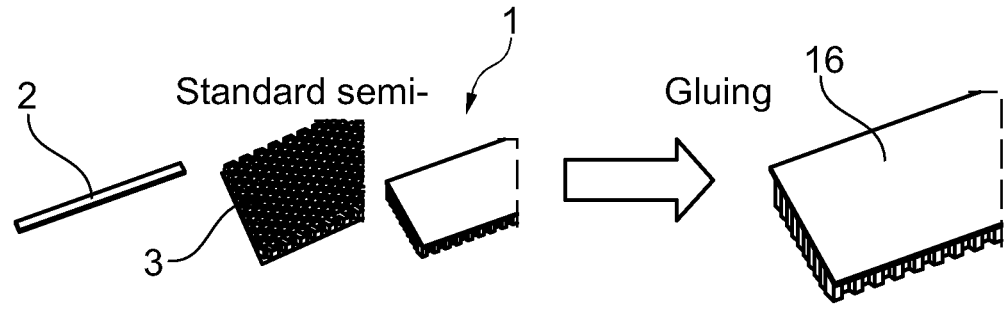
FIG. 4 depicts the method to produce the inventive reinforcement member.
Figure 4:
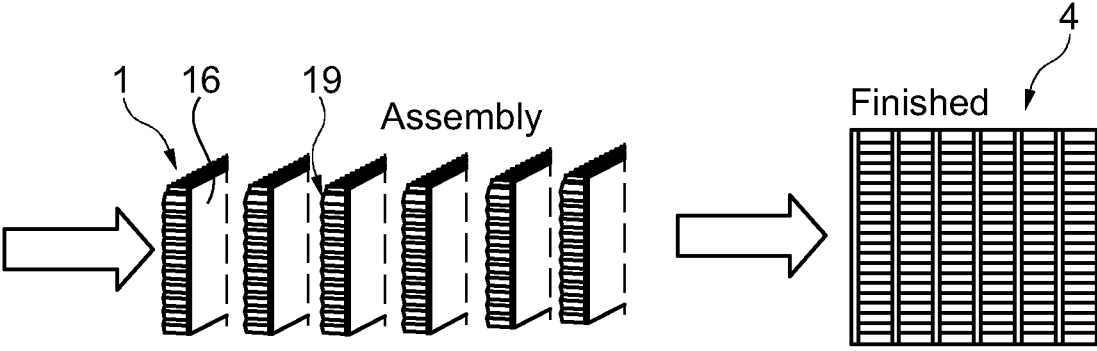

The assembly process of the reinforcement member 4 is explained according to FIG. 4. At first standard semi-finished products are provided which each comprise a plate 2 and a layer 3 of hollow cells. The plate 2 and the layer 3 can be provided as one single part, for example by moulding. The plate 2 and the layer 3 can also be, as depicted, assembled to provide the semi-finished part 1. The connection between the plate and the layer 3 can be a material bond and/or a form- and/or force-fit. In the present case, the surface opposite from the layer 3 is provided with an adhesive layer 16, in the present case a continuous adhesive layer 16. In the next step, the individual reinforcement elements 1, in the present case six elements, are connected by pressing the adhesion layer 16 against the free end 19 of the layer 3 of hollow cells.

The connection between the reinforcement elements 1, regardless how it is executed, is preferably such, that it does not delaminate during an impact. The same is true for the connection between the plate and the layer 3 of hollow cells.

FIGS. 5a-5d show the inventive reinforcement member 4 assembled in the structure 7 of a vehicle. In the present case the structure 7 is a beam, as can be particularly seen in FIG. 5d.

According to this example, the reinforcement member 4 comprises three connected reinforcement elements 1. As can be particularly seen in FIG. 5a, the sidewall 11 of the structure 7 comprises an indentation 8 at which the left-hand side plate 2 of the reinforcement member 4 is not in contact with the sidewall 11. The consequences of a side crash can be seen particularly according to FIGS. 5a-5c. In the embodiment according to FIG. 5a the structure 7 and the reinforcement member 4 are in their original state. In FIG. 5b, the side impact 6 starts to compress the structure 7 and hence, the reinforcement member 4. Due to the indentation 8 in the sidewall 11 of the structure 7, the reinforcement member 4 is not only compressed but twisted locally, which is depicted by arrow 9. This twisting, but also the entire deformation of the reinforcement member 4, dissipates so much energy, that the battery case 10, which is relative to the impact 6 behind the structure 7 including the reinforcement member 4 is not deformed at all, so that batteries, which are stored in the case are well protected. This can be seen from FIG. 5c which shows the final state at the end of an impact. In FIG. 5d, the final state after the impact 6 is also depicted. It can be seen, that the reinforcement member 4 is deformed locally but that the battery case is fully intact.

Figure 5:
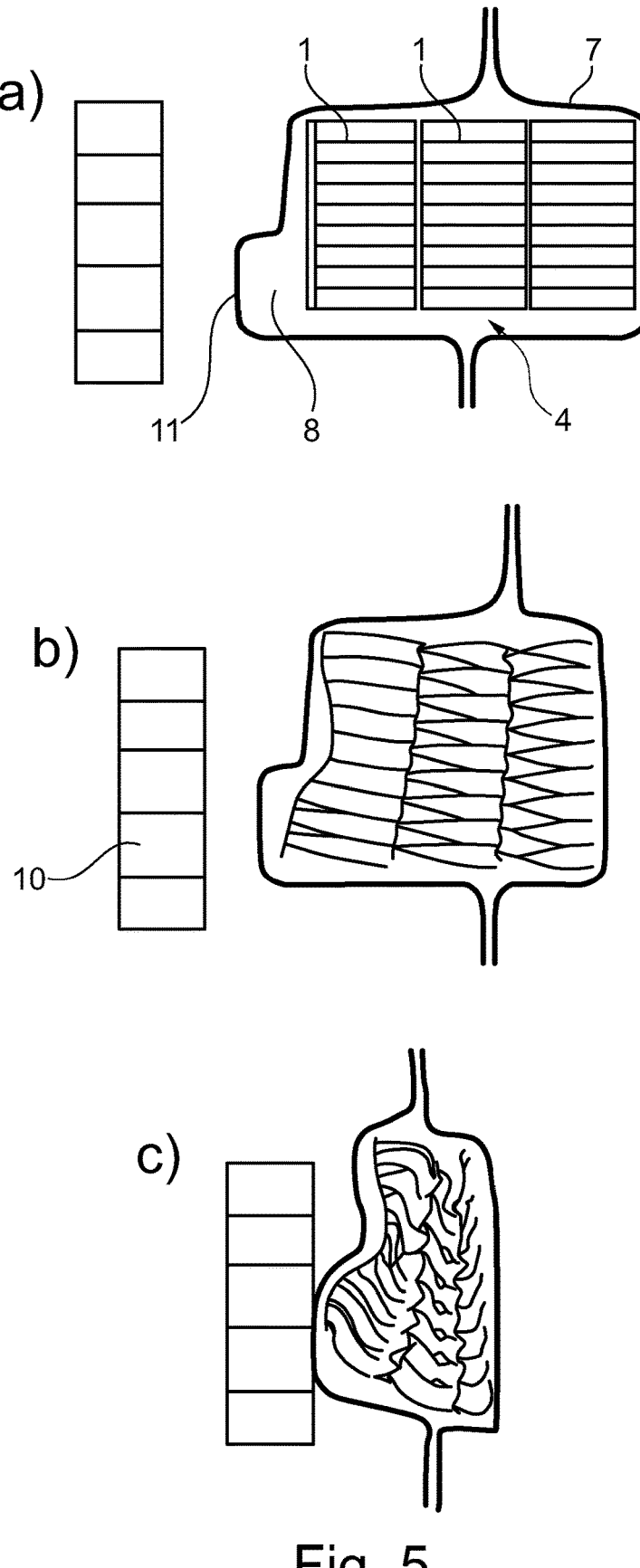
Figure 5:
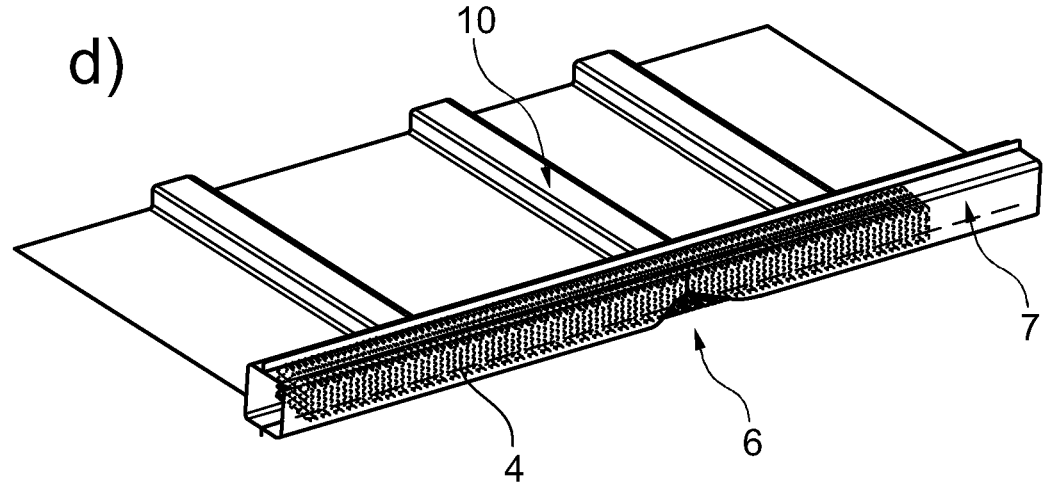

FIG. 6 shows an alternative embodiment of the reinforcement member 4. In the present case, the reinforcement member 4 is asymmetrical relative to one of its center planes 21, in the present case, the center plane 21 that is parallel to the impact direction 6. The asymmetry is in the present case due to an inclined surface 12. This embodiment of the reinforcement member 4 is particularly advantages for embodiments in which the sidewall 11 of the structure 7 is straight and does not have an indentation 8 as shown in FIG. 5. Due to the asymmetry during an impact, the reinforcement member 4 also twists as explained according to FIG. 5 and hence shows an improved energy absorption.

Figure 7:
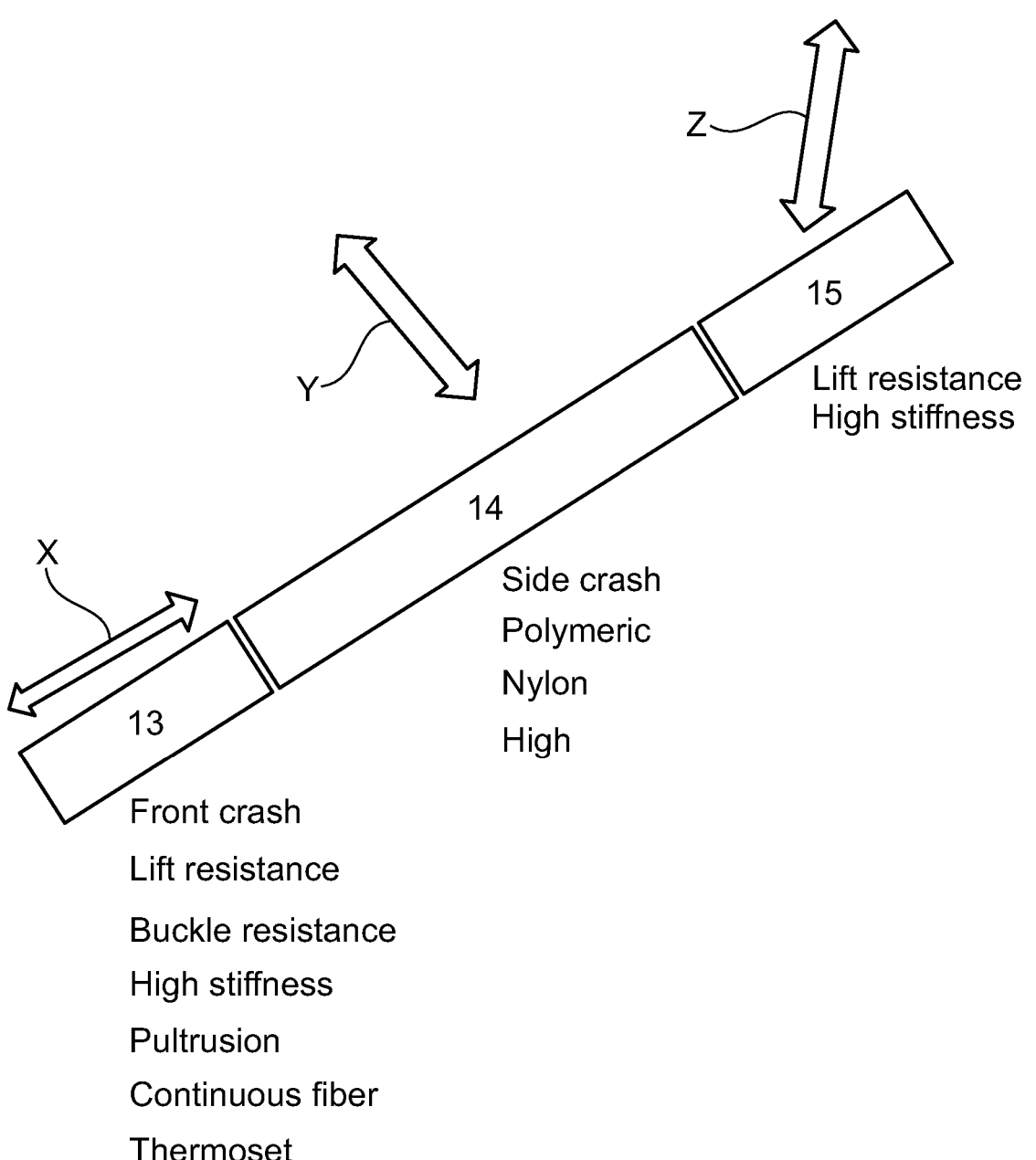

FIGS. 7-10 show a preferred embodiment of the inventive reinforcement member. In the present case, this reinforcement member 4 comprises three sections 13-15. These sections can differ in terms of material as well as in terms of the reinforcement elements 1 and/or their orientation. The section 13 is preferably designed to absorb a front crash, while the section 14 is preferably designed to absorb a side crash and the section 15 is preferably designed to improve the stiffness of the rear of a vehicle for example during lifting of the vehicle for repair. The common coordinate system X-Z used in automotive applications is depicted in FIG. 7. In FIG. 7 also preferred load applications as well as preferred martials are listed. In FIGS. 8-10 a preferred embodiment of the reinforcement member according to FIG. 7 is depicted. FIG. 9 shows a section of the middle segment 14 as well as of the rear segment 15. The middle section 14 is the reinforcement member already explained previously, for example according to FIGS. 2 and 3. In the segment 15, in the present case four reinforcement elements 1 are connected. The plates 2 of these reinforcement elements extend in the present case in a horizontal plane while the longitudinal extension direction 18 of the hollow cells of layer 3 extends vertically. Due to this arrangement particularly forces in Z-direction can be absorbed. In FIG. 10, the segment 13 and the segment 14 are depicted. Regarding segment 14 reference is made to the above-said. Segment 13 is designed to absorb a front crash. Consequently, the longitudinal extension direction 18 of the hollow cells are directed in X-direction and the plates 2 perpendicular to the X-direction to absorb a load in X-direction.

FIG. 11 shows a specific embodiment of the inventive reinforcement element. In the present case, the reinforcement elements 1 are not identical. Starting from the left-hand side the second and the fifth layer differ from the rest, because the orientation of the longitudinal extension direction of the cells is different in comparison to the first, third, fourth and sixth layer. In layers two and five the longitudinal extension direction is rotated by 90° so that this axis is in present case parallel to the main extension direction 5 of the reinforcement member 4. Due to this design, this reinforcement member 4 can absorb impacts into different directions, for example aside and a front impact. The skilled person understands, that the orientation, the shape, the size and/or the length of layer 3 can differ from reinforcement element to reinforcement element.

FIG. 12 shows an embodiment in which the plate 2 is not a continuous solid part, but also comprises hollow structures.

REFERENCE SIGNS 1 reinforcement element
2 plate
3 layer of hollow cells
4 reinforcement member
5 main extension of the reinforcement member 4
6 reinforcement direction, impact direction, side impact
7 structure, structure of a vehicle beam, cavity
8 rotation means, indentation
9 rotation
10 battery case
11 sidewall of the structure, sidewall of the cavity
12 rotation means, inclined surface at the reinforcement member
13 front segment of a reinforcement member
14 middle-segment of a reinforcement member
15 rear segment of a reinforcement member
16 connection layer, adhesive layer
17 hollow structure, cells
18 longitudinal extension direction
19 one end of the structure
20 bottom of the plate
21 center plane
22 width of the reinforcement member 4
X longitudinal direction of a vehicle, front to rear extension
Y transverse direction
Z vertical direction

The invention claimed is:

1. A vehicle reinforcement system comprising:
a first reinforcement member extending along a longitudinal axis, the first reinforcement member comprising a stack of first reinforcement elements situated parallel to each other; and
a second reinforcement member extending along the longitudinal axis, the second reinforcement member comprising a stack of second reinforcement elements situated parallel to each other;
wherein each reinforcement element comprises a plate and a layer of a plurality of hollow cells, each hollow cell of the plurality extending in a longitudinal extension direction that is perpendicular to the plate, adjoining the plate at a first end, and adjoining the plate of an adjacent reinforcement element at an opposite, second end;

wherein the longitudinal extension direction of the hollow cells of the first reinforcement member is substantially perpendicular to the longitudinal extension direction of the hollow cells of the second reinforcement member;

wherein adjacent first reinforcement elements within the first reinforcement member are interconnected by a material bond and/or by a form- and/or force-fit;

wherein adjacent second reinforcement elements within the second reinforcement member are interconnected by a material bond and/or by a form- and/or force-fit; and wherein at least one of the reinforcement members is asymmetric relative to one of its center planes.

2. The vehicle reinforcement system according to claim 1, wherein the layers of a plurality of hollow cells are honeycombs.

3. The reinforcement system according to claim 1, wherein the first and second reinforcement elements respectively absorb energy and/or provide stiffness in a different load directions.

4. A vehicle including a structure, wherein the structure is reinforced by the vehicle reinforcement system according to claim 1.

5. The vehicle according to claim 4, wherein a cross-section of the reinforced structure comprises an indentation.

6. The vehicle according to claim 4, wherein the structure surrounds at least partially a battery case.

7. The vehicle according to claim 4, wherein in an impact with a second vehicle at least a portion of the vehicle reinforcement system rotates and/or twists during the impact.

8. The vehicle according to claim 7, wherein at least a portion of the vehicle reinforcement system is deformed plastically.

9. A method of producing the vehicle reinforcement system according to claim 1 comprising interconnecting reinforcement elements, wherein the reinforcement elements are glued or welded together and/or connected by a force- and/or form-fit.

10. The vehicle reinforcement system of claim 1, further including a vehicle battery case, wherein the first reinforcement member and the second reinforcement member are aligned adjacent the battery case.

* * * * *